C. & A. SPRING.

Turning Lathe.

No. 23,957.

Patented May 10, 1859.

Witnesses
J. B. Crosby
W. B. Gleason

Inventors
Charles Spring
Andrew Spring

UNITED STATES PATENT OFFICE.

CHARLES SPRING AND ANDREW SPRING, OF BOSTON, MASSACHUSETTS.

LATHE FOR TURNING IRREGULAR FORMS.

Specification of Letters Patent No. 23,957, dated May 10, 1859.

*To all whom it may concern:*

Be it known that we, CHARLES SPRING and ANDREW SPRING, both of Boston, in the county of Suffolk and State of Massachusetts, have invented a new combination designed for turning such articles as are to be brought to a point, or are to be finished or turned at one end and therefore cannot conveniently be held to be operated upon otherwise than by the opposite end; and we do hereby declare that the following, taken in connection with the accompanying drawings, which form part of this specification, is a clear, full, and exact description of our invention and sufficient to enable those skilled in the art to practice it.

Figure 1:
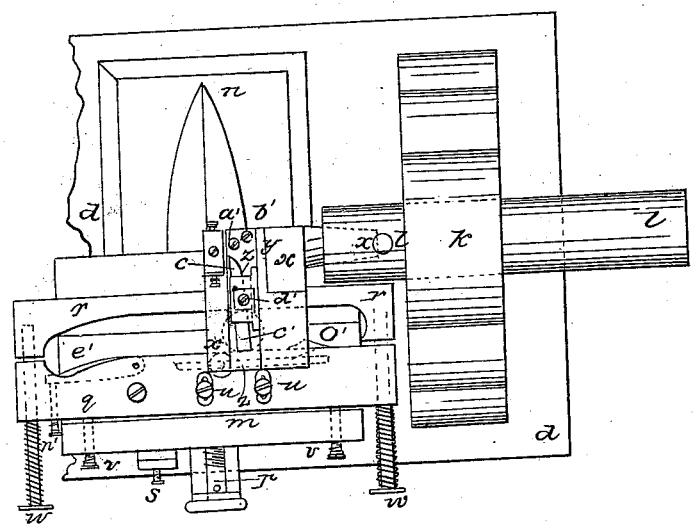
Figure 2:
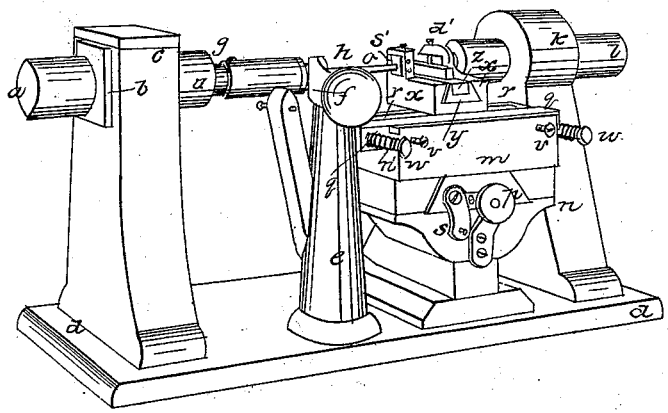

Figure 2 is a perspective view embodying our invention, and Fig. 1 is a plan exhibiting more in detail some of its parts.

($c$) represents the head stock, and ($b$) the tail stock of a lathe fixed upon a bed ($d$).

The spindle ($a$) is supported and rotated in the manner usual in lathes, and carries a chuck which seizes and holds by one end the article ($o$) to be operated upon. The spindle ($l$) in the tail stock ($k$), is capable of traversing backward and forward in the axial line of the lathe's rotation, but does not itself rotate. This movement may be accomplished by the means usual for this purpose in lathes. The carriage ($m$) is raised from the lathe bed ($d$) in the support ($n$) on which it is guided, in movements toward and from ($o$), by means of the usual "ways." Rotation of the screw ($p$) causes the movements of the carriage ($m$), and the set screw ($s$) is used to gage the diameter of the article operated upon, which it does by striking on ($n$) which is fixed to the lathe bed and arrests further onward movement of ($m$).

Fixed upon ($m$) and partaking its movements is the arrangement which modifies the movement of the tool carrier; this arrangement consists of two principal parts, ($q$), and ($r$): ($q$) is pivoted to ($m$) by screw ($t$), and is held in any desired position by the screws ($u$), ($q$) being slotted where these screws pass through it into ($m$); it may here be mentioned that this provision for the adjustment of ($q$) is for the purpose of giving any required taper to ($o$), and that the screws ($v$) aid in the adjustment of ($q$). The piece ($r$) is connected with ($q$) by the guide rods ($w$) passing through the latter, and fixed in the former; compressed spiral springs around ($w$) act to draw ($r$), and the roll shown in dotted lines Fig. 1, toward ($q$). The carriage ($x$) rests upon and slides over ($q$) and ($r$) and bears with it the tool holder ($y$), which is of angular form and can slide within ($x$) toward and from ($o$).

It is to ($y$) that the roll, before mentioned as shown in dotted lines Fig. 1, is fixed, ($x$) being slotted where it passes through to admit of movement of ($y$). A portion of ($x$) extends upward and is made to fit in a hole bored for that purpose in the spindle ($l$). To admit of nice adjustment of the tool ($c$) the piece ($z$) is pivoted to ($y$) and raised and lowered by operating at the end opposite the pivot, the set screw ($a'$) and holding screw ($b'$): ($z$) is extended above and over the tool ($c'$) so that by the action of the set screw ($d'$) the tool is confined to or released from ($y$).

On that side of ($x$) preceding the tool in its cutting movement toward the chuck, and forming a part of, or fixed to ($x$), is a yoke arranged to contain a die ($s'$); this die is made in two parts, having a hole through them, half in each part, of just the diameter of the material from which the finished article is to be formed. This hole in the die is made and kept concentric with the axis of the lathe's rotation by set screws, one of which acts on opposite sides of each half, and also one from the top, and another from beneath. The sides of ($q$) and ($r$) with which the roll fixed in ($y$) comes into contact should conform nearly to the general outline of the article to be turned.

A slot is made in ($q$) from that side touching the roll and in about the center of its thickness; within this slot may be placed any desirable pattern projecting beyond the acting face of ($q$), and this pattern may be adjustable. In the particular instance illustrated, ($q$) and ($r$) are formed for turning awls, or machine needles. The pattern ($e'$), which is adjustable by means of the set screw ($n'$) is pivoted in ($q$) and serves to shape the shank of the awl or needle while the pattern ($o'$), which is adjustable along the length of ($q$), as well as outward from it, serves to form and shape the point.

A groove is formed in ($q$), as shown in dotted lines Fig. 1, in which the pivot of ($o'$) is permited to slide, and the pattern is held in position by the pinch produced by the action of the screws ($u$) ($u$).

The material from which any article is to be turned by the use of our invention must be cylindrical and straight, and the hole in the die must be of its diameter. The carriage ($x$) is forced forward and drawn back by the spindle ($l$), and the direction of its movement is at all times parallel with the axis of the lathe's rotation. The tool holder ($y$) partakes of the movement ($x$), and is at the same time moved toward and from the piece to be turned by the action of the shaping mechanism described as existing in ($q$), ($r$), ($e'$) and ($o'$) upon the roll or pin fixed in ($y$) and passing through ($x$).

The arrangement of the shaping mechanism illustrated by the drawings, is that designed and adapted to the formation of awls or machine needles.

The action of the springs upon the guide rods ($w$), draws ($r$) against the roll fixed in ($y$) and keeps is constantly pressed against ($q$) and the projecting parts of the adjustable formers ($e'$) and ($o'$) therein arranged. The form and adjustment of ($e'$) govern the shape of that part of the awl between its haft and shaft, and the form and adjustment ($o'$) the shape of the point, and as ($o'$) is adjustable along the length of ($q$) any length of awl or needle within the limits of the machine can be brought to a point. Provision is made for giving any desired amount of taper to the shape of the needle or awl by the inclination of ($q$), obtainable by pivoting on ($t$) and adjustable by the screws ($v$).

The tool is adjusted and held in the best position for cutting, by the screws ($d'$) ($a'$) ($b'$), and the diameter of the article to be turned is varied by the action of screw ($p$), and gaged by the screws ($s$).

The chuck used to hold the material to be operated on may be any of the well known forms of gripping or holding chucks that hold fast by one end the article which is to be turned. We prefer to use such a chuck as we have fully described in an application for Letters Patent bearing even date herewith.

Prior to our invention awls and needles have been brought to a point by grinding by hand, a process which, evidently, is apt to leave the point out of the center of the needle, and the part near the haft has either been left with a square shoulder or else curved by the action of a separate tool from that which formed the shaft, sometimes used as a hand tool.

Among the advantages derived from the use of our invention may be mentioned that the article is turned perfectly true at one operation, and no time is lost by re-chucking, hand-tooling, or grinding.

Having described our invention, what we claim therein as new, and desire to secure by Letters Patent of the United States is—

The combination of a gripping chuck, by which an article can be so held by one end as to present the other free to be operated upon, with a rest preceding the cutting tool, when it is combined with a guide cam or its equivalent which modifies the movement of the cutting tool, all operating together for the purpose set forth.

CHARLES SPRING.
ANDREW SPRING.

Witnesses:
J. B. CROSBY,
W. B. GLEASON.